(12) United States Patent
Doshi et al.

(10) Patent No.: US 8,282,907 B2
(45) Date of Patent: Oct. 9, 2012

(54) HYDROGEN GENERATION PROCESSES AND APPARATUS AND CONTROL SYSTEM

(75) Inventors: Kishore J. Doshi, Fernandina Beach, FL (US); Robert J. Sanger, Chicago, IL (US)

(73) Assignee: Hyradix, Inc., Des Plaines, IL (US)

( * ) Notice: Subject to any disclaimer, the term of this patent is extended or adjusted under 35 U.S.C. 154(b) by 691 days.

(21) Appl. No.: 12/375,991

(22) PCT Filed: Jul. 6, 2007

(86) PCT No.: PCT/US2007/015511
§ 371 (c)(1),
(2), (4) Date: Feb. 2, 2009

(87) PCT Pub. No.: WO2008/016463
PCT Pub. Date: Feb. 7, 2008

(65) Prior Publication Data
US 2009/0317323 A1    Dec. 24, 2009

Related U.S. Application Data

(60) Provisional application No. 60/834,861, filed on Aug. 2, 2006.

(51) Int. Cl.
*C01B 3/22* (2006.01)
*C01B 3/24* (2006.01)
*C01B 3/26* (2006.01)

(52) U.S. Cl. ......... 423/648.1; 48/61; 423/650; 423/651; 423/652; 429/423; 429/424; 429/425

(58) Field of Classification Search ............... 423/648.1, 423/650, 651, 652, 653, 654
See application file for complete search history.

(56) References Cited

U.S. PATENT DOCUMENTS

| | | | |
|---|---|---|---|
| 6,280,864 B1 | 8/2001 | Towler et al. | |
| 6,348,278 B1 * | 2/2002 | LaPierre et al. | ............... 429/411 |
| 6,436,354 B1 | 8/2002 | Priegnitz et al. | |
| 7,914,933 B2 * | 3/2011 | Bolton et al. | ................. 429/420 |
| 2002/0071975 A1 | 6/2002 | Shimazu | |
| 2004/0020124 A1 | 2/2004 | Russell et al. | |
| 2004/0180249 A1 | 9/2004 | Pham et al. | |
| 2004/0182002 A1 | 9/2004 | Malhotra et al. | |

FOREIGN PATENT DOCUMENTS

WO    WO 2005/118126    12/2005

* cited by examiner

*Primary Examiner* — Wayne Langel
(74) *Attorney, Agent, or Firm* — Stephen A. Gratton

(57) ABSTRACT

Hydrogen generators and processes for operating hydrogen generators using partial oxidation/steam reforming of fuel are provided that can achieve desirable Net Hydrogen Efficiencies over a range of fuels and hydrogen product production rates and purities. Superheated steam for the reformer feed is provided through indirect heat exchange with the reformate and through indirect heat exchange with a flue gas. The relative portions of superheated steam from each heat exchange is adjusted to enhance Net Hydrogen Efficiency as a demand condition such as hydrogen product production rate or purity changes, and cooler oxygen-containing gas is used to avoid precombustion temperatures in the reformer feed.

10 Claims, 1 Drawing Sheet

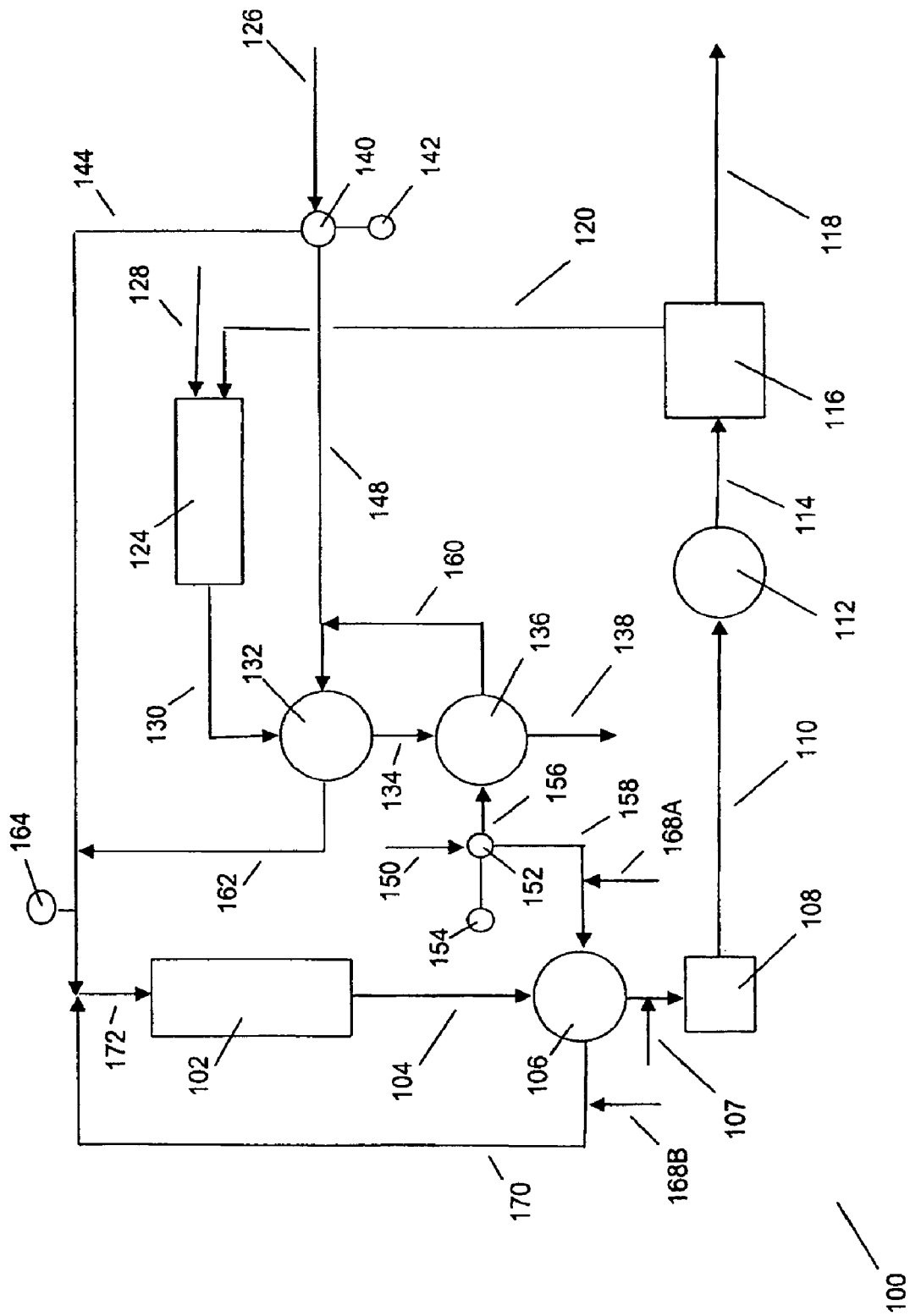

HYDROGEN GENERATION PROCESSES AND APPARATUS AND CONTROL SYSTEM

FIELD OF THE INVENTION

This invention relates to processes for generating hydrogen involving the partial oxidation and reforming of fuel, especially to autothermal reforming processes, which can operate over a range of hydrogen production rates using a variety of fuels while still providing attractive net efficiencies of hydrogen generation. The hydrogen generators using the processes of this invention may find beneficial use in smaller-scale hydrogen plants.

BACKGROUND TO THE INVENTION

Hydrogen is used as a feedstock for many chemical processes and has been proposed as an alternative fuel especially for use in fuel cells in stationary and mobile facilities. Steam reforming of hydrocarbon-containing feedstock is a conventional source of hydrogen. Steam reforming of hydrocarbons is practiced in large-scale processes, often at a facility having refinery or chemical operations. Thus, for instance, the large-scale hydrogen plant will likely be able to draw upon the skills within the entire facility to operate sophisticated unit operations to enhance hydrogen production efficiency. An additional benefit of having a large scale hydrogen plant within a facility having refinery or chemical operations is that the steam generated in the hydrogen plant from cooling the steam reforming effluent and by heat exchange with the combustion of waste gases has value to such other refinery or chemical operations. The benefits of practicing steam reforming in large-scale plants are also apparent from the nature of the equipment and process. For instance, steam reforming generally uses very high temperatures, often in excess of 800° C., which in turn requires expensive materials of construction. Furthermore, large-scale hydrogen plants typically provide hydrogen product purity in excess of 99 volume percent with less than 10 parts per million by volume (ppmv) of carbon monoxide.

While the economics of large-scale steam reforming make attractive the shipping of hydrogen from such a large-scale reformer to the point of use, hydrogen, nevertheless, is difficult to store and distribute and has a low volumetric energy density compared to fuels such as gasoline. Thus an interest exists in developing economically and practically viable smaller-scale hydrogen generators to provide hydrogen from a hydrocarbon-containing feedstock for use or distribution at a point proximate to the consumer.

There are a number of practical hurdles for such a smaller-scale hydrogen generator to overcome before it is commercially viable beyond overcoming the loss of economy of scale. For instance, the smaller scale may not make economically viable retaining sophisticated operating and technical staff and thus the hydrogen generator must be able to operate reliably with minimal operator support while still providing an economically acceptable hydrogen product meeting purity specifications.

Often smaller-scale hydrogen generators face problems that do not occur with large-scale hydrogen plants. An example is that the demand for hydrogen product or purity may change from time to time. Additionally, the source of hydrocarbon-containing feedstock may change due to availability or cost. Moreover, whether or not a given hydrogen generator will need to accommodate a change in feedstock, manufacturers of smaller-scale hydrogen generators would benefit from having a generator that can accommodate the feedstock sought by the customer. And, smaller-scale hydrogen generators may be stand alone units with no chemical or refinery operation for integration to improve combined economics.

Due to capital expense and a more facile ability to turn down production rates, alternative reforming technology such as partial oxidation/steam reforming, including autothermal reforming, has been considered instead of steam reforming. But as a portion of the feed is oxidized in the reformer, efficiency penalties are taken that are not incurred by steam reforming.

Doshi, et al., in WO 2005/118126, published Dec. 15, 2005, disclose hydrogen generators and processes for generating hydrogen using partial oxidation/steam reforming, especially autothermal reforming, that can achieve attractive efficiencies while still taking advantage of the lower capital costs. These processes have conversion efficiencies (Net Hydrogen Efficiencies or NHE) of at least about 50 percent, preferably at least about 55 percent, without a water gas shift. With a water gas shift, net hydrogen efficiencies of at least about 55, and often in excess of 60, percent may be achieved. The Net Hydrogen Efficiency is the ratio of lower heating values of the recovered hydrogen product stream to the lower heating value of the hydrocarbon feed stream:

$$NHE = \frac{P \times LHV_P}{F \times LHV_F} \times 100$$

where P=molar flow of net hydrogen product (mol/hr)
$LHV_P$=lower heating value of product hydrogen (kJ/mol)
F=molar flow of hydrocarbon feedstock (mol/hr)
$LHV_F$=lower heating value of hydrocarbon feedstock (kJ/mol).

The processes disclosed by Doshi, et al., effect the partial oxidation/steam reforming at high pressures, e.g., at least about 400, preferably at least about 500, kPa absolute. They disclose that the undue adverse effect from high pressure reforming is avoided by the use of a heat integrated steam cycle employing a ratio of steam to carbon in the hydrocarbon-containing feedstock above about 4:1. Doshi, et al, teach the use of a heat integrated steam cycle to counter the adverse effect of pressure and of energy consumption required to vaporize the higher amounts of steam. The heat integrated steam cycle takes advantage of the increased mass of effluent from the partial oxidation reformer to generate at least about 40, and preferably at least about 50, percent of the steam for supply to the reformer at a high temperature, e.g., at least about 300° C. or 350° C., preferably at least about 400° C., say 450° to 600° C.

In the preferred aspects of their invention, Doshi, et al., disclose taking advantage of waste gas from hydrogen purification operations such as membrane separations and pressure swing adsorptions. The waste gas is combusted to generate, in combination with the steam generated by cooling the effluent from the reformer, at least about 90 percent of the steam supplied to the reformer. The heat from the combustion is also used to heat at least a portion of the feed to the partial oxidation reformer. In these preferred aspects, steam and heat are obtained from the unrecovered hydrogen instead of consuming additional hydrocarbon-containing feedstock.

Although Doshi, et al., have made significant advances in providing efficient hydrogen generators that take advantage of low capital costs, additional benefits can be realized in enhancing the flexibility of the hydrogen generator especially by being able to use a wide variety of fuels, including normally liquid and normally gaseous fuels; by being able to achieve a high turndown ratio; and by being able to produce a hydrogen product within a wide range of hydrogen purities, all without unduly adversely affecting the capital costs and Net Hydrogen Efficiency of the hydrogen generator.

Achieving these additional benefits is not without problems. For instance, since the feed to the partial oxidation/steam reformer reactor contains oxygen as well as the hydrocarbon-containing feedstock, care must be taken to assure that adverse effects such as pre-combustion are avoided. Additionally, with liquid fuels, the fuels must be vaporized such that a uniform mixture of hydrocarbon-containing feedstock, steam and oxygen are passed through the reformer. Also hydrogen purity of the product has a significant effect on the amount of unrecovered hydrogen available for combustion to provide heat to one or more streams to the reformer. With higher purity hydrogen products, especially with pressure swing sorption purification, the portion of hydrogen that is contained in the purge and thus unrecovered, is greater than that where a lower hydrogen purity product is sought. Achieving the ability to operate over wide turndown ranges can additionally pose problems especially in an energy integrated hydrogen generator.

SUMMARY OF THE INVENTION

By this invention processes and apparatus for hydrogen generation using partial oxidation/steam reforming, especially autothermal reforming, are provided that can accommodate a wide range of fuels, can accommodate high turndown ratios, and can yield hydrogen product of a desired purity over a wide range without an undue loss in Net Hydrogen Efficiency. In accordance with this invention, the temperature of the oxygen-containing stream to a partial oxidation/steam reformer is adjusted to facilitate using a wide variety of feeds. By adjusting the amount and temperatures of steam generated by process streams as well as the relative portion of the steam generated using heat contained in the effluent from the partial oxidation/steam reformer, desirable Net Hydrogen Efficiencies can be obtained over a wide turndown ratio and over a wide range of hydrogen product purities.

In one broad aspect, the processes of this invention for generating hydrogen from a fuel comprises:
a. admixing a sufficient amount of at least one lower temperature, oxygen-containing stream with at least one higher temperature, oxygen-containing stream, said higher temperature, oxygen-containing stream being at or above the autoignition temperature of the fuel due to indirect heat exchange with a flue gas, to provide a combined oxygen-containing stream having a temperature below the autoignition temperature of the fuel;
b. admixing said combined oxygen-containing stream with at least one stream containing fuel and steam to provide a reformer feed, wherein the molar ratio of oxygen, steam and fuel is suitable for partial oxidation/steam reforming;
c. reforming the reformer feed under partial oxidation/steam reforming conditions to provide a reformate containing hydrogen;
d. subjecting the reformate to indirect heat exchange conditions with a cooling stream comprising at least one of water and steam to provide a superheated steam stream and a cooler reformate;
e. supplying at least a portion of the superheated steam stream as a portion of the reformer feed; and
f. recovering hydrogen product from the cooler reformate.

Preferably step (f) comprises at least one of membrane separation and pressure swing sorption to provide the hydrogen product and at least a portion of the hydrogen in the reformate that is not contained in the hydrogen product is combusted to provide the flue gas, at least a portion of which is subjected to indirect heat exchange with an oxygen-containing stream to provide the at least one higher temperature, oxygen-containing stream. More preferably, the higher temperature, oxygen-containing stream comprises steam.

The term "partial oxidation/steam reforming" as used herein is intended to encompass a catalytic reforming processes in which a portion of the hydrocarbon-containing feedstock supplied to the reformer is oxidized in-situ to produce heat for the endothermic reforming process and a portion of the hydrocarbon-containing feedstock is reacted, or reformed, with steam to provide a reforming effluent, or reformate.

The term "autoignition temperature" as used herein means the temperature at which the fuel will precombust with air in the absence of catalyst. Giroudiére, et al., in a paper presented at the 16$^{th}$ World Hydrogen Conference, June 2006, state that autoignition of a reformer feed is detrimental to the net hydrogen efficiency of the unit. They state at page 6 that autoignition is a relationship between temperature and time.

Another broad aspect of the processes of this invention for generating hydrogen from a fuel to provide a hydrogen product at differing production rates and purities comprises:
a. admixing at least one oxygen and steam-containing stream with at least one fuel and steam-containing stream to provide a reformer feed, wherein the molar ratio of oxygen, steam and fuel is suitable for partial oxidation/steam reforming;
b. reforming the reformer feed under partial oxidation/steam reforming conditions to provide a reformate containing hydrogen;
c. subjecting the reformate to indirect heat exchange conditions with a coolant to provide a cooler reformate;
d. recovering hydrogen product from the cooler reformate comprising at least one of membrane separation and pressure swing sorption to provide the hydrogen product and at least one reject stream containing a portion of the hydrogen in the reformate that is not contained in the hydrogen product;
e. combusting said reject stream to provide a flue gas; and
f. subjecting at least a portion of the flue gas to indirect heat exchange with a process stream,
wherein:
i. the at least one fuel and steam-containing stream is derived from step (c) wherein the coolant comprises at least one of water and steam and a superheated steam stream is obtained, said fuel being added to at least one of the coolant and the superheated steam stream;
ii. the process stream for step (f) comprises at least a portion of the oxygen for the reforming and at least one of water and steam to provide at least a portion of the oxygen and steam-containing stream of step (a); and
iii. in response to a change from a first demand condition, i.e., at least one of hydrogen product production rate and purity, to a second demand condition, the ratio of (i) steam in the oxygen and steam-containing stream to (ii) steam in the fuel and steam-containing stream is changed to enhance the Net Hydrogen Efficiency at the second demand condition, while maintaining a molar ratio of oxygen to fuel to steam in the reformer feed suitable for step (b).

In a preferred embodiment of this aspect of the processes of this invention, at least a portion of the oxygen for the reforming of step (b) is provided by an oxygen-containing stream that is at a lower temperature than the oxygen and steam containing stream from step (ii), said portion being sufficient to maintain the reformer feed below autoignition temperature prior to step (b).

The preferred processes of this invention are at high pressures, e.g., at least about 400, preferably at least about 500, kPa absolute and use an integrated steam cycle employing a ratio of steam to carbon in the hydrocarbon-containing feedstock of at least about 3:1 such that the mass of reformate is sufficient to generate at least about 40, and preferably at least about 50, percent of the steam for supply to the reformer at a high temperature, e.g., at least about 300° C. or 350° C., preferably at least about 400° C., say 450° to 600° C. Advantageously at least about 90 percent, and preferably substantially all, of the steam in the reformer feed is obtained by indirect heat exchange with the reformate and by indirect heat exchange with the flue gas.

In another preferred embodiment of the processes of the invention, the reformate is subjected to water gas shift conditions as part of the hydrogen product recovery. While the broad aspects of the invention do not require using a water gas shift, the use of a water gas shift unit operation serves to convert carbon monoxide and steam into incremental additional hydrogen and carbon dioxide.

Often the purity of the hydrogen product is at least about 98 mole percent and may be as much as 99.999 mole percent or more. The percent of the hydrogen in the reformate that is recovered as hydrogen product is generally at least about 70, say, 70 to 98, mole percent.

The hydrogen generators of this invention comprise:
a. a partial oxidation/steam reformer having an inlet and an outlet and adapted to reform a mixture of fuel, steam and oxygen to provide a reformate containing hydrogen;
b. at least one indirect heat exchanger in fluid communication at a hot side inlet with the outlet of the reformer and adapted to provide a cooler reformate at a hot side outlet, said heat exchanger having a cool side inlet and a cool side outlet;
c. a pressure swing sorption system having an inlet, a product outlet and a purge outlet, the inlet of said pressure swing sorption system being in fluid communication with the hot side outlet of the indirect heat exchanger (b) and adapted to provide a hydrogen product from the product outlet having a higher hydrogen purity than that of the reformate, and to provide a purge from the purge outlet containing hydrogen from the reformate that is not contained in the hydrogen product;
d. a combustor having a feed region in fluid communication with the purge outlet of the pressure swing sorption system (c) and a source of oxygen-containing gas and an exhaust region, said combustor being adapted to combust purge to provide a flue gas at said exhaust outlet;
e. at least one indirect heat exchanger in fluid communication at a hot side inlet with the exhaust outlet of the combustor (d) and adapted to provide at a hot side outlet a cooler flue gas, said heat exchanger having a cool side inlet and a cool side outlet;
f. a mixer assembly having a by-pass oxygen-containing gas inlet, a main oxygen-containing gas inlet in fluid communication with the cool side outlet of heat exchanger (e), a fuel and steam mixture inlet in fluid communication with the cool side outlet of heat exchanger (b) and an outlet in fluid communication with the inlet of reformer (a), said mixer adapted to mix oxygen-containing gas passed into by-pass oxygen-containing gas inlet and oxygen-containing gas passed into main oxygen-containing gas inlet to provide a combined oxygen containing gas, and then mix the combined oxygen-containing gas with fuel and steam mixture passed into fuel and steam mixture inlet to provide a reformer feed;
g. an oxygen valve assembly having an inlet adapted to receive an oxygen-containing gas, and a by-pass outlet in fluid communication with the by-pass oxygen-containing inlet of mixer assembly (f) and a main outlet in fluid communication with the cool side inlet of indirect heat exchanger (e) which is adapted to provide a heated main oxygen-containing stream at the cool side outlet;
h. a sensor and control assembly adapted to sense the temperature of the combined oxygen-containing gas and adapted to adjust the volume of oxygen-containing gas passing from the by-pass outlet of oxygen valve assembly (g); and
i. a water valve assembly having a water inlet and a first water outlet in fluid communication with the cool side inlet of heat exchanger (e) and a second water outlet in fluid communication with the cool side inlet of heat exchanger (b), said water valve assembly being adapted to control the rate of water supplied to the hydrogen generator and the proportion of water passing from the first water outlet and the second water outlet.

BRIEF DESCRIPTION OF THE DRAWING

The drawing is schematic flow diagram of a process in accordance with this invention.

DETAILED DESCRIPTION

Feed Components:

The fuels used for reforming contain carbon and may be normally gaseous, liquid or solid, but need to be substantially gaseous under reforming conditions. The fuels may be substantially hydrocarbon such as hydrocarbon gases such as methane, ethane, propane, butane and the like; hydrocarbon liquids such as petroleum fractions containing 5 or more carbons including gasoline and kerosene fractions, or even hydrocarbon solids such as waxes that are gaseous under the reforming conditions such as cetane. Other fuel types include oxygenated hydrocarbons such as alkanols, alkane diols and alkane triols, carboxylic acids, carboxylic esters, aldehydes, ketones, and ethers such as ethanol, propanol, ethylene glycol, glycerol, acetic acid, methyl formate, methyl acetate, dimethyl ether, acetaldehyde, methylethyl ketone, and the like.

Natural gas and liquid petroleum gas typically contain odorants such that leaks can be detected. Odorants conventionally used are one or more organosulfur compounds such as organosulfides, e.g., dimethyl sulfide, diethyl sulfide, and methyl ethyl sulfide; mercaptans, e.g., methyl mercaptan, ethyl mercaptan, and t-butyl mercaptan; thiophenes of which tetrahydrothiophene is the most common; and the like. The amount used can vary widely. For natural gas, the organosulfur component is often in the range of about 1 to 20 parts per million by volume (ppmv); and for LPG a greater amount of sulfur compounds are typically used, e.g., from about 10 to 200 ppmv. It is not unusual for commercially obtained hydrocarbon feeds to contain also other sulfur compounds that may be natural impurities such as hydrogen sulfide and carbonyl sulfide. Carbonyl sulfide concentrations in natural gas and LPG of 0.1 to 5 ppmv are not unusual.

Regardless of the form, sulfur compounds are generally undesirable in the product hydrogen and can be deleterious to catalysts used in hydrogen generators such as water gas shift catalysts. The processes of this invention provide flexibilities as to where sulfur is removed. If desired, the hydrocarbon-containing feed can be desulfurized. Any convenient desulfurization technique may be used including sorption and hydrodesulfurization. In an aspect of this invention, the desulfurization occurs subsequent to reforming. In the reforming process, substantially all the sulfur components are converted to hydrogen sulfide. Hydrogen sulfide can then be removed from the reformate by sorption. If desired a guard bed can be used upstream of the reformer containing transition metal exchanged molecular sieve such as zinc or copper exchanged zeolite X or zeolite Y to assist in the removal of sulfur compounds, especially thiophenes such as tetrahydrothiophene.

The hydrocarbon-containing feeds can contain other impurities such as carbon dioxide, nitrogen and water. In the processes of this invention, it is preferred that the concentration of carbon dioxide be less than about 10, preferably less than about 5, volume percent (dry basis).

Water in addition to that contained in the other feed components to the process is used to achieve the high steam to carbon ratios of the feed to the partial oxidation reformer. Due to the large quantities of water contained in the feed to and the reformate from the reformer, recycling of water is usually effected. The water is preferably deionized water.

By controlling the temperature of the oxygen-containing gas for the reforming through a by-pass of oxygen-containing gas, conditions that promote precombustion of the fuel can be avoided while still using the heat from the combustion of the unrecovered hydrogen. The temperature at which precombustion can occur varies by the fuel and its environment.

Air is typically used as the source of the oxygen for the partial oxidation/steam reforming. The term "air" as used herein is intended to include air or oxygen-enriched air, i.e., up to about 30 volume percent oxygen.

Any suitable water source can be used to generate steam. For purposes of avoiding maintenance, filtering and deionizing water may be desired.

The mole ratio of total water to carbon in the fuel (steam to carbon ratio) is at least about 3:1, sometimes at least about 4:1, preferably between about 4.5:1 to 8:1. The mole ratio of available oxygen to carbon in the hydrocarbon-containing feed is generally within the range of about 0.4:1 to 0.6:1. Where the fuel contains oxygen such as an alcohol, that oxygen is an available oxygen as is molecular oxygen in air.

Process Conditions

The partial oxidation/steam reforming is catalytic. The overall partial oxidation and steam reforming reactions for methane are expressed by the formulae:

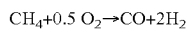

$$CH_4 + 0.5\, O_2 \rightarrow CO + 2H_2$$

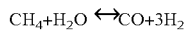

$$CH_4 + H_2O \leftrightarrow CO + 3H_2$$

The reformer may comprise two or more discrete sections, e.g., a first contact layer of oxidation catalyst followed by a second layer of steam reforming catalyst, or may be bifunctional, i.e., oxidation catalyst and steam reforming catalyst are intermixed in a single catalyst bed or are placed on a common support. The partial oxidation reformate comprises hydrogen, nitrogen, argon, carbon oxides (carbon monoxide and carbon dioxide), steam and some unconverted hydrocarbons.

Partial oxidation/steam reforming conditions typically comprise a temperature (measured at the catalyst outlet) of at least about 600° C. up to about 800° C., and is preferably between about 640° and 730° C. In the broad aspects, partial oxidation/steam reforming includes reforming processes where supplemental external combustion of a fuel, e.g., hydrocarbon-containing feedstock or hydrogen-containing stream such as an anode waste gas from a fuel cell, is used to provide heat for reforming by indirect heat exchange. As between the in situ partial oxidation and the supplemental external combustion for indirect heat exchange, the partial oxidation preferably generates at least 70 percent, preferably substantially all, the heat (excluding the heat carried with the feed to the reformer from heat exchange with the reformate or from the combustion of unrecovered hydrogen such as contained in the purge gas from a pressure swing adsorber, the retentate from a membrane separation and anode waste gas if the hydrogen product is used as a feed to a fuel cell), i.e., an autothermal reforming process.

The pressure in the reforming conditions of the processes of this invention is preferably at least about 400 kPa, say from about 500 kPa to 1500 or 2500 kPa, preferably from about 500 kPa to about 1200 kPa, absolute. Thus the recovery of the hydrogen product by pressure swing adsorption or membrane separation can often be done without an intervening compression.

Sometimes, on a dry basis, the components of the effluent from the reformer fall within the ranges set forth below:

| REFORMER EFFLUENT COMPONENTS, DRY BASIS | |
|---|---|
| Component | Mole Percent, Dry Basis, Partial oxidation/steam reforming |
| Hydrogen | 35 to 55, frequently 40 to 50 |
| Nitrogen | 25 to 45, frequently 30 to 40 |
| Carbon monoxide | 1 to 10, frequently 2 to 4 |
| Carbon dioxide | 10 to 20, frequently 12 to 15 |

A purified hydrogen product is obtained from the reformate through one or more unit operations.

A water gas shift may or may not be used for recovery of the hydrogen product. A water gas shift is the most commonly used catalytic process for converting carbon monoxide into carbon dioxide and more hydrogen. Generally, the shift reactor contains at least one water gas shift reaction zone. In the shift reactor carbon monoxide is exothermically reacted in the presence of a shift catalyst in the presence of an excess amount of steam to produce additional amounts of carbon dioxide and hydrogen.

The shift reaction is an equilibrium reaction, and lower carbon monoxide concentrations are favored at lower temperatures. Thus conventionally a plurality of shift stages are used from high temperature, e.g., in excess of 350° or 400° C., to lower temperature, e.g., below about 250° C. The heat integrated steam cycle of this invention can eliminate the necessity of having a water gas shift in order to achieve acceptable net hydrogen efficiencies, thus saving in capital costs and operating complexities. If a water gas shift is desired to obtain even higher net hydrogen efficiencies, the heat integrated steam cycle enables most of the benefit to be obtained using only a water gas shift at moderate, or medium, temperature shift conditions, e.g., between about 250° C. and about 400° C. If a water gas shift is used, the Net Hydrogen Efficiency is often at least about 55, and sometimes above 60, percent.

Other catalytic processes for reducing carbon monoxide in the reformate include selective oxidation. While in the broad aspects selective oxidation can be used, it is generally less preferred not only because of the addition of equipment and operating complexities, but also, the selective oxidation can consume some of the hydrogen.

For many applications, the hydrogen product from the reforming has to have a high hydrogen concentration, e.g., 98 volume percent hydrogen or better. Thus, not only must carbon monoxide be removed, but also other components contained in the reformate such as carbon dioxide, nitrogen and water. The high pressure reformate of this invention makes feasible hydrogen purification by membrane or pressure swing adsorption.

Any suitable membrane and membrane configuration may be used for separation of hydrogen as a permeate. Typical membranes include polymeric membranes operable with feed temperatures of between about ambient and 150° C. and metallic membranes, e.g., platinum or palladium, at feed temperatures of up to 500° C. The pressure on the permeate side of the membrane is often less than about 200 kPa absolute.

Pressure swing adsorption is a preferred unit operation for purifying the reformate. Desirably the pressure swing adsorption provides a hydrogen product stream of at least about 98, preferably at least 99, or 99.5, volume percent hydrogen and contains less than about 10 or 20, preferably less than about 5, ppmv of carbon monoxide. Usually the pressure swing adsorption recovers at least about 60, preferably at least about 70, percent of the hydrogen contained in the stream fed to the pressure swing adsorption.

Any suitable adsorbent or combination of adsorbents may be used for the pressure swing adsorption. The particular adsorbents and combinations of adsorbents used will, in part, depend upon the components of the feed to the pressure swing adsorber, the sought compositions in the purified hydrogen product and the geometry and type of pressure swing adsorber used. Adsorbents include molecular sieves including zeolites, activated carbon activated alumina and silica gel. Particularly advantageous sorbents include a combination of sorbents with the first portion of the bed being composed of activated carbon which is particularly effective for water, methane and carbon dioxide removal followed by one or more molecular sieves such as NaY, 5A, 13X, lithium or barium exchanged X, silicalite and ZSM-5. The sorbents may be of any suitable particle size given the constraints of pressure drop and bed lifting for an up-flow fixed bed.

The pressure swing adsorber may be of any suitable design including rotary and multiple bed. The purging of the bed may be by vacuum, but most conveniently for simplicity, the purge is above ambient atmospheric pressure. A preferred pressure swing adsorption system for low maintenance operation uses at least four fixed beds. By sequencing the beds through adsorption and regeneration steps, a continuous flow of purified hydrogen stream can be achieved without undue loss of hydrogen. With at least four beds, one bed at a given time will be adsorbing, while other beds will be undergoing regeneration or pressure equalization steps. Preferably, at least one, and more preferably two or three, pressure equalization steps are used to increase hydrogen recovery. See WO2005/118126 A1 for further information about the operation of a pressure swing sorption system for use in a hydrogen generator.

The process and apparatus of this invention will be further illustrated with respect to the drawing. The drawing and the following discussion are not intended to be in limitation of the broad aspects of the invention.

Hydrogen generator 100 contains autothermal reformer 102 which contains catalyst. Hot reformate exits reformer 102 via line 104 and is passed to indirect heat exchanger 106 where it is cooled by indirect heat exchange with water to produce steam for the reformer feed. Often, heat exchanger 106 cools the reformate from the temperature it exits the reformer to within the range of 250° to 400° C., preferably 280° to 350° C. While one heat exchanger is shown, it is understood that more than one heat exchanger can be used.

A fundamental aspect of an integrated steam cycle, which is a preferred mode of operation of the processes of this invention, is to use the hot reformate to generate a significant portion of the steam fed to the reformer and to provide some superheating to the steam. At higher reforming pressures, the use of an integrated steam cycle can enhance Net Hydrogen Efficiency.

Preferably at least about 40, say, about 50 to 60 or even 75, percent of the steam supplied to the partial oxidation reformer is generated by cooling the reforming effluent. The large amount of steam in the feed to the reformer serves to increase the mass of the reformate to assure that sufficient thermal energy is available to generate the sought amount of steam through cooling the reformate. The high temperature of the reforming effluent is effectively used not only to provide a substantial portion of the steam requirements but also to super heat to the steam-containing stream. In general, at higher steam to carbon ratios, it is preferred to generate a greater proportion of the steam by heat exchange with the reformate than at the lower ratios. This is especially true where a purified hydrogen product is obtained by membrane or pressure swing adsorption treatment and the purge or retentate gas is combusted to provide heat to feed to the reformer. Thus, the heat from the reformate is primarily used for the generation of steam and to a lesser extent for superheating the steam. Preferably, the amount of the steam generated by cooling the reformate does not exceed that which results in the steam-containing stream having a temperature of less than about 300° C., and preferably not less than about 400° C.

As depicted, the cooled reformate from heat exchanger 106 is passed to water gas shift reactor 108. Water or steam can be introduced via line 107 to increase the equilibrium driving force toward the generation of more hydrogen in the shift reaction. The use of a water gas shift reactor is optional. The water gas shift equilibrium is influenced by temperature with lower temperatures favoring the conversion of carbon monoxide and water to carbon dioxide and hydrogen. In some instances, where a single shift reactor stage is used, it is at a mid or lower temperature, e.g., between about 220° C. to 400° C. Alternatively, two water gas shift stages can be used, one at a higher temperature, e.g., 300° C. or 350° C. to 450° C., followed by another stage at a temperature at least 50° C. lower.

A water gas shift reaction product is withdrawn from shift reactor 108 via line 110 and passes to heat exchanger/condensor 112 which cools the gas to a temperature suitable for processing in a pressure swing sorption system. Also, water is condensed and removed from the gas. The heat exchange coolant is typically process water. The condensed water can be recycled to the process.

The cooled gas is passed via line 114 to pressure swing sorption system 116. A useful pressure swing adsorption system is depicted in FIG. 4 of WO2005/118126 A1. As the pressure of the shift effluent is high, no additional compressor may be necessary to provide attractive feed pressures for the pressure swing adsorption.

Purified hydrogen is withdrawn from pressure swing adsorption system 116 via line 118. The purge from pressure swing adsorption system 116 is passed via line 120 to combustor 124 as it contains hydrogen useful as fuel. Combustor 124 is preferably a catalytic combustor. As shown, air for combustion is provided via line 128. If desired, one or more components may be added to the purge stream such as additional fuel or a cathode and/or anode waste gas if hydrogen is used as a fuel for a fuel cell. The combustion effluent, or flue gas, exits via line 130.

The flue gas is passed via line 130 to indirect heat exchanger 132 where it is used to heat an air and steam feed for the reformer. Alternatively, a combination combustor and heat exchanger may be used such as disclosed in WO2005/118126 A1. The cooler flue gas is passed from heat exchanger 132 to heat exchanger 136 via line 134. Usually the flue gas in line 134 will be at temperatures within the range of 200° C. to 500° C. Heat exchanger 134 uses heat in the flue gas to generate steam. The flue gas is exhausted from the hydrogen generator via line 138.

With respect to the air supply for the hydrogen generator, compressed air is supplied via line 126. Valve assembly 140 is adapted to provide a by-pass stream of air which exits via line 144 and a main stream of air which is passed via line 148 with added water and/or steam to the cool side of heat exchanger 132. A hot air and steam stream is withdrawn from the cold side of heat exchanger 132 via line 162. Often this stream is at a temperature in the range of about 450° C. to 750° C., say, 500° C. to 700° C.

The by-pass air stream in line 144 and the steam and air stream in line 162 are mixed to provide an admixed air-containing stream prior to combination with the fuel for reforming. The relative portions of the by-pass air stream and the main air stream are such that temperature of the admixed air-containing stream is below that which can result in precombustion of the fuel when admixed with the steam and fuel-containing stream. This temperature may be the same, higher or lower than the temperature of the steam and fuel containing stream, provided that the temperature of the reformer feed during and after admixing is below the precombustion temperature. As shown temperature sensor 164 provides a signal corresponding to the temperature of the admixed air-containing stream which is transmitted to controller 142. Controller 142 compares the measured temperature with the target temperature for a given fuel and adjusts valve assembly 140 as needed to provide the relative portions of by-pass air and main air to achieve the sought temperature of the admixed air-containing stream.

Water for the reforming is provided to hydrogen generator 100 via line 150. Valve assembly 152 serves to provide a water stream at a defined rate of flow via line 156 to the cool side of heat exchanger 136 where it is vaporized to steam and exits via line 160 and is fed to the cold side of heat exchanger 132. If desired, a portion of the water may by-pass heat exchanger 136 and be fed directly to the cool side of heat exchanger 132.

Valve assembly 152 also serves to provide a water stream at a defined rate of flow via line 158 to heat exchanger 106 for generating steam for the reforming as discussed above. Valve assembly 152 is controlled by controller 154 to establish the absolute and relative flow rates for water flow in lines 156 and 158. In preferred operations, the guiding principles for determining the amount and split of the water streams include maximizing recovery of heat from the pressure swing sorption purge and minimizing the amount of fuel that is combusted in reformer 102. The desired amount and split of water will change as the production rate of hydrogen product is changed and will change as the purity of the hydrogen product is changed. For example, as the pressure swing sorption system is required to provide hydrogen of a higher purity, the volume of the purge stream will increase, thus providing more available heat in the flue gas. The amount of water provided by valve assembly 152 can be increased due to the additional heat available, thereby increasing the steam to carbon ratio of the reformer feed. Also, the temperature of the steam and air stream in line 162 may increase due to the increased heat available in the flue gas. To prevent precombustion, temperature sensor 164 and controller 142 provide for more by-pass air to assure that the admixed air-containing stream to be combined with fuel is at an acceptable temperature. Similarly, where the rate of hydrogen production is increased, but at the same purity, changes in ambient heat losses as well as purge volumes due to changed pressure swing sorption cycle rates, will require changes in the amount water supplied and the split and require a change in the amount of air and the portion that is by-pass air.

The point at which fuel is supplied to hydrogen generator 100 can vary depending upon the type of fuel. Preferably, fuel is mixed with air after it has been mixed with steam. As shown fuel can be supplied via line 168A or 168B. Line 170 carries the fuel and steam mixture to line 172 for combination with the admixed air-containing stream. As shown, a length of conduit is used as the mixer for forming the admixed air-containing stream and a length of conduit (line 172) is used as the mixer to form the reformer feed. If desired, other mixing devices such as venturi's, agitators, and the like can be used.

By way of example, the following simulation data illustrate the benefits of the processes of this invention. For this simulation, an apparatus such as depicted in the drawing is used. In all cases, the reformer temperature is 700° C. and the flue gas temperature from the burner is 700° C. Table I sets forth parameters for different operations.

TABLE I

| Parameter | Run 1 | Run 2 | Run 3 | Run 4 |
|---|---|---|---|---|
| Feed | LPG | LPG | LPG | Ethanol |
| Hydrogen Product, $Nm^3/hr$ | 100 | 100 | 25 | 100 |
| Hydrogen Product Purity, Mole % | 99.95 | 99.99 | 99.95 | 99.95 |
| Fuel, kg/hr | 41.6 | 43.3 | 10.4 | 63.2 |
| Air, $Nm^3/hr$ | 120.8 | 125.7 | 30.8 | 104.7 |
| By-pass air, $Nm^3/hr$ | 66.4 | 69.1 | 16.2 | 14.7 |
| Reformer feed temp., ° C. | 500 | 500 | 500 | 428 |
| Water, kg/hr | 233.3 | 242.7 | 58.5 | 175.4 |
| Portion of water to reformate heat exchanger 106, mass percent | 60.00 | 59.99 | 59.83 | 64.99 |
| Steam to carbon ratio | 4.6 | 4.6 | 4.5 | 3.4 |

It is claimed:

1. A process for generating hydrogen from a fuel to provide a hydrogen product comprising:
   a. admixing an oxygen and steam-containing stream with a fuel and steam-containing stream to provide a reformer feed comprising oxygen, the fuel and steam with a molar ratio of the oxygen, the steam and the fuel in the reformer feed selected to provide partial oxidation/steam reforming conditions,
   b. reforming the reformer feed under the partial oxidation/steam reforming conditions to provide a reformate comprising hydrogen;
   c. subjecting the reformate to indirect heat exchange with water to provide a cooler reformate and steam;
   d. recovering the hydrogen product and a reject stream from the cooler reformate;
   e. combusting the reject stream to provide a flue gas; and
   f. subjecting at least a portion of the flue gas to indirect heat exchange with a process stream,
   wherein:
   i. the steam from step (c) is combined with the fuel and steam-containing stream prior to step (a), said steam from step (c) providing at least 40 percent of the steam in the reformer feed, ii. the process stream for step (f) comprises at least a portion of the oxygen and steam-containing stream, and iii. in response to a change in a rate of production or a purity of the hydrogen product, a ratio of steam in the oxygen and steam-containing stream to steam in the fuel and steam-containing stream is changed to increase a Net Hydrogen Efficiency of the process.

2. The process of claim 1 further comprising maintaining the reformer feed below an autoignition temperature during step (b).

3. The process of claim 1 wherein a mass of the reformate is sufficient to generate the steam in step (c) at a temperature above 400° C.

4. The process of claim 1 wherein between 40 to 75 percent of the steam in the reformer feed is obtained by step (c).

5. The process of claim 1 wherein the fuel comprises a compound selected from the group consisting of natural gas, LPG, alkanol, alkanediol and alkanetriol.

6. The process of claim 1 wherein the fuel comprises ethanol.

7. The process of claim 1 wherein the fuel comprises a hydrocarbon.

8. The process of claim 1 wherein the partial oxidation/reforming conditions comprise a pressure of at least 400 kPa absolute.

9. The process of claim 1 wherein the reformate is subjected to water gas shift conditions during step (d).

10. The process of claim 3 wherein step (d) comprises pressure swing sorption.

* * * * *